United States Patent Office 3,418,079
Patented Dec. 24, 1968

3,418,079
TEST PAPER FOR THE DETERMINATION OF PROTEIN IN BIOLOGICAL FLUIDS
Hans-Georg Rey, Mannheim, and Peter Rieckmann, Mannheim-Waldhof, Germany, assignors to C. F. Boehringer & Soehne G.m.b.H., Mannheim-Waldhof, Germany, a corporation of Germany
No Drawing. Filed Oct. 18, 1965, Ser. No. 497,497
Claims priority, application Germany, Nov. 13, 1964, B 79,314
24 Claims. (Cl. 23—253)

The present invention relates to a new article of manufacture and to methods of making and using the same. More particularly, the present invention is concerned with novel diagnostic test papers and with a method for the preparation thereof.

The qualitative and quantitative detection of protein in biological fluids, such as in urine, spinal fluid, synovial fluid, etc., is of great diagnostic significance, especially in the case of kidney diseases, circulatory debility, arteriosclerosis, hypertonia diabetes, arthritis, accidental injury, meningitis, etc. A number of methods for the detection of protein are known, for example, the procedures conventionally known as the sulfo-salicylic acid test, the acetic acid boiling test, the nitric acid ring test and the picric acid test. All these methods depend upon precipitation reactions and cannot be carried out without laboratory reagents, apparatus, and fairly large fluid samples. Where a rapid diagnostic technique is indicated, these reactions are not feasible; what is required is a simple color reaction which can be carried out in a routine manner by unskilled persons, with substantially no equipment as, for example, with the help of test papers.

A color reaction suitable for protein detection was first described by Feigl et al. (Mikrochim. Acta, 2, 107/1937). This reaction utilizes the known, so-called "protein error" in various indicators; if the pH value of the reagent is kept below the indicator change region then, upon the addition of a protein solution, a color change occurs which is independent of the pH value and is caused by the protein content; the color intensity of the resultant color is dependent upon the concentration of the protein in the solution to be tested. Feigl developed this protein detection as a spot reaction, using therefor the potassium salt of tetrabromophenolphthalein ethyl ester and acetic acid as reagents. For the preparation of protein test papers based on the Feigl reaction, the acetic acid must, of course, be replaced by a non-volatile acid. According to British patent specifications Nos. 814,223, 826,066 and 840,362, an acidic buffer substance, such as citrate buffer, can be advantageously used for this purpose, preferably together, with a surface-active agent. However, the protein test strips which were obtained in accordance with this technique are not completely satisfactory since the color contrasts of negative and positive protein tests in concentrations of below 0.1% protein differ very little. The positive test appears more or less yellow-green, the negative test is green-yellow and its color is darker than the dry test strip. The sensitivity of these test papers also leave something to be desired. The detection limit amounts to about 0.03–0.01% protein. However, it is necessary for the physician to be able to detect protein in the urine in the same concentrations as are possible with the acetic acid boiling test. Therefore, satisfactory test strips must be capable of detecting down to 0.005% of protein in the urine.

According to the procedures described in the above-mentioned British patent specifications, the absorbent carrier is impregnated with a solution which contains the buffer substance, together with the dyestuff indicator. From copending U.S. patent application Ser. No. 333,178, now U.S. Patent No. 3,359,072 it is known that substantially more sensitive protein test papers are obtained when the buffer substance and the dyestuff indicator are separately applied to the carrier, i.e., one after the other. The test papers thus obtained are pale yellow in color and produce on contact with protein-containing urine, strong blue colorations which are graduated according to the protein concentration and which differ clearly from the yellow coloration of the negative test. Protein in concentrations of down to 0.005% can be satisfactorily detected. However, in the case of long storage periods, these protein test strips gradually become greenish and thereby lose their sensitivity. Furthermore, in the case of the known protein test papers, weakly positive reactions are sometimes observed even in the case of protein-free urine, which is due to unknown components in the urine. Thus it has been established that these false indications are sometimes brought about by excessive amount of creatinine in the urine.

It is, accordingly, an object of this invention to provide an improved process for obtaining sensitive and stable protein test papers.

It is another object of this invention to provide sensitive and stable protein test papers capable of detecting protein in biological fluids in an amount down to 0.005%.

Another object of this invention is to provide sensitive and stable protein test papers capable of detecting protein in biological fluids and visibly reporting the presence of such protein by a color change thereof which color change is gradated with respect to the protein concentration.

Still another object of this invention is to provide sensitive and stable protein test papers capable of detecting protein in biological fluids which can be hygienically handled.

Other objects will be apparent from the description and claims which follow.

These and other objects are successfully attained by means of this invention as described more fully hereinafter.

Surprisingly, we have now found that very sensitive and stable yellow colored protein test papers can be prepared, which also do not tend to give false indications in the presence of unknown urine components, when the test papers are additionally impregnated with solutions of inorganic sulfates.

In accordance with the present invention, it has now been found that stable, sensitive diagnostic test papers for the determination of protein in biological fluids are provided by an absorbent (porous) carrier which has been impregnated with (1) a dyestuff indicator exhibiting the so-called "protein error";
(2) an acidic buffer substance; and
(3) with at least one inorganic sulfate.

The diagnostic test papers according to the present invention can preferably also be impregnated with a surface-active substance.

The new diagnostic test papers according to the present invention are preferably impregnated with the inorganic sulfates in the form of a 1–10% solution in an organic solvent. Solvents for this purpose are strongly polar, readily volatile organic liquids, such as halogenated hydrocarbons, methanol, acetone, or ethanol, and the preferred solvents are those which are good solvents for both the inorganic sulfates and the dyestuff indicators.

As inorganic sulfates there may be employed all water-soluble sulfates as sodium sulfate, potassium sulfate, magnesium sulfate, zinc sulfate, aluminum sulfate etc., however preferred inorganic sulfates are magnesium sulfate and zinc sulfate.

As dyestuff indicators, there may be suitably employed those which have a large protein error with an indicator change in the acid pH range. Instances of preferred indicators are tetrabromophenolphthalein ethyl, isopropyl and butyl esters, as well as tetrabromobenzaurin, tetrabromophenolblue, bromophenolblue, bromochlorophenolblue, bromokresolgreen and similar triphenylmethan-dyestuff indicators.

In principle, all those buffer systems may be used which can be adjusted to a pH value below 7, for example phosphate buffer, phthalate buffer, citrate-phosphate buffer, borate succinate buffer etc. Preferably, there is employed a citrate buffer, i.e., an aqueous solution of citric acid and tertiary sodium citrate.

In order to increase the absorbency of the test papers and thus to increase their speed of reaction and sensitivity, a conventional surface-active agent is advantageously added to one of the impregnation solutions. Preferably the surface-active agent is added to the impregnation solution containing the acidic buffer agent. Illustrative of the surface-active agents which can be used for the purposes of the invention are the fatty alcohol sulfonates, alkyl aryl sulfonates and polycarboxylic acid ester sulfonates. In preparing the new test papers of the present invention, there have proved to be particularly useful nitrogen-containing, anion-active wetting agents, such as fatty acid taurides ("Hostapon CT," "Hostapon STT," "Eriopon AT," "Hostapon TF," 'Hostapon KTW neu,") fatty acid glycides "Tego-Betain L 10," "Tego-Betain L 7," "Tego-Betain L 3"), polycarboxylic acid alkylamide sulfonic acids (Humectol C"), alkyl sulfone glycides ("Emulsogen STH") and N-substituted fatty amide sulfonates.

The preparation of the new diagnostic test papers according to the present invention takes place in the conventional manner: the absorbent carrier, such as filter paper, is impregnated, in the known manner as for instance described in the above-mentioned British patent applications, with a solution which contains the buffer agent, together with the dyestuff indicator. After drying and preferably after air-drying the protein test paper is impregnated with a 1–10% solution of an inorganic sulfate and then the paper (twice impregnated) is dried again. However, it is preferred to use the process described in U.S. patent application Ser. No. 333,178, now U.S. Patent No. 3,359,072, i.e., the absorbent carrier is first impregnated with the buffer substance and then after drying, impregnated with a solution of the indicator dyestuff which additionally contains the inorganic sulfate.

The test papers obtained in this manner can either be used as such or alternatively they can be sealed with synthetic resin foils in the manner described in our U.S. patent application Ser. No. 262,827 now U.S. Patent No. 3,232,710. In the latter case, it has proved to be advantageous to seal the test paper together with a second, non-impregnated paper strip. A more uniform coloration of the test strip is thereby ensured when carrying out the detection reaction.

In the case of the process for the preparation of the test papers as set out in U.S. patent application Ser. No. 333,178 now U.S. Patent No. 3,359,072 now U.S. Patent No. 3,232,710, the choice of a suitable solvent for the indicator is of great importance. If, for example, methanol or acetone is used for this purpose then a test paper is obtained which has a green base color speckled with several blue flecks. Uniformly yellow colored protein test papers are only obtained with the use of halogenated hydrocarbons as solvents. Surprisingly, however, in the process according to the present invention, by the addition of the inorganic sulfates, uniformly bright yellow colored test papers can also be produced in the case of the use of methanol or ethanol as well as with other organic solvents for the indicator dyestuff.

The very sensitive, stable and strongly yellow colored protein test papers according to the present invention do not give a false positive reaction in the case of protein-free urine and thereby ensure an increased safety when they are used as diagnostic agents. Further, the practical use of these test strips as diagnostic agent is made simpler and more reliable by the clearer change of color from yellow to blue.

The following examples are directed to the preparation and utilization of the novel test papers of the invention. These examples are merely illustrative and hence are not to be construed in a limiting manner.

Example 1

Filter paper (Schleicher and Schüll No. 2316) was first impregnated with an impregnation solution having the following composition and then air dried:

| | |
|---|---|
| Tertiary sodium citrate solution (2 mol) ____ml__ | 11 |
| Citric acid solution (2 mol) _____ml__ | 39 |
| Tetrabromophenol blue _____g__ | 0.04 |
| Ethanol _____ml__ | 50 |

The paper was subsequently impregnated with a 5% methanolic solution of magnesium sulfate and again dried.

The dried paper had a yellowish color and satisfactorily indicated protein in urine down to a concentration of 0.01%. The color of the paper did not change when it was moistened with protein-free normal urine or even when it was moistened with urine containing large amounts of creatinine. However, in contradistinction thereto, papers which have not been treated with magnesium sulfate show, in the case of normal, protein-free urine, relatively weak reaction colors, depending on the nature of the urine, which weak color can be mistaken for a slight protein content in the urine.

Example 2

Filter paper (Schleicher & Schüll No. 2316) was first impregnated with a buffer solution having the following composition and then air dried:

| | |
|---|---|
| Tertiary sodium citrate_____g__ | 9.80 |
| Citric acid_____g__ | 3.50 |
| Sodium lauryl sulfate_____g__ | 0.05 |
| Distilled water_____ml__ | Ad 100.00 |

The paper was subsequently impregnated with an indicator solution having the following composition and again dried:

| | |
|---|---|
| Tetrabromophenolphthalein ethyl ester_____mg__ | 40.0 |
| Magnesium sulfate_____g__ | 5.0 |
| Methanol (or ethanol)_____ml__ | Ad 100.0 |

A second series of papers was prepared using instead of the magnesium sulfate-containing solution, a zinc sulfate-containing solution having the following composition:

| | |
|---|---|
| Tetrabromophenolphthalein ethyl ester_____mg__ | 40 |
| Zinc sulfate_____g__ | 5 |
| Methanol _____ml__ | Ad 100 |

The dried paper was rolled up and the rolls cut crosswise to form strips of the desired breadth, i.e., of 5 mm. The test strips which were obtained in this manner were yellowish colored and the color thereof did not change when the papers were moistened with protein-free, normal urine. The presence of protein in the urine was indicated by blue colorations which varied according to the protein content. Using these test strips, protein could be detected in urine down to a concentration of 0.005%.

Example 3

Filter paper (Schleicher & Schüll No. 2316) was first impregnated with a buffer solution having the following composition and thereafter air dried:

| | |
|---|---|
| Tertiary sodium citrate | g-- 9.80 |
| Citric acid | g-- 3.50 |
| Sodium salt of a fatty acid methyl glycide ("Medialan" KA, conc.) | g-- 0.05 |
| Distilled water | ml-- Ad 100.00 |

The dried paper was thereafter impregnated with an indicator solution having the following composition and again dried:

| | |
|---|---|
| Tetrabromophenolphthalein ethyl ester | mg-- 40 |
| Magnesium sulfate | g-- 5 |
| Methanol | ml-- Ad 100 |

There was obtained a yellow colored test paper, the color of which did not change in the case of protein-free urine and which, in the case protein was present in urine, showed a blue color of varying intensity depending upon the protein content. A color reaction could be satisfactorily observed with these test papers with a protein content in urine of down to 0.001%.

The stability of the protein test papers prepared according to Examples 1, 2, and 3 was evaluated by storing the test papers for 12 weeks at 40° C. In comparison with samples which had been stored at room temperature, they showed no differences in appearance and in reaction sensitivity, i.e., the yellow color remained unaltered. In contradistinction thereto, protein test papers which had been prepared without the use of sulfates became discolored from yellow to grey even after only a short storage under the conditions as above set out.

In order to have particularly advantageous test papers or in order to have test papers suitable for a number of determinations (i.e., the test papers of the invention in combination with other test papers), the test papers of the present invention can, advantageously, be sealed between a white or opaque and a colorless, transparent, polyethylene-coated polyterephthalic acid ester foil by the process described in U.S. patent application Ser. No. 262,827 issued to U.S. Patent No. 3,232,710. In this case, reagent paper strips of 5 mm. width are placed between two strips of synthetic resin foil (about 30 cm. wide) as above set out and thereafter passed through two rollers, one or both of which is or are heated. As a result of the heat contact, the synthetic resin foils weld or the paper strip welds with the synthetic resin foils on one or both sides thereof. Flat grooves on the rollers ensure a definite welding of the foils along the lateral edges of the paper strips. The synthetic resin foils welded together and/or with the paper strips are thereafter cut transversely to the reagent paper strips. There are thereby obtained narrow strips of foil 60 mm. long and 5 mm. wide which contain a piece of reagent paper of about 5 x 5 mm. size exposed only at the cut ends thereof; that is, the paper is covered on both sides with foil and the test solution is absorbed through the open cut edge on being immersed therein.

It has proved to be advantageous to seal the test strips together with a second, non-impregnated paper strip, such as filter paper Schleicher & Schüll No. 1450. In this case, the sealing is carried out in such a manner that the strips to be combined lie one on top of the other (superimposed), the test strip being covered by the transparent foil and the non-impregnated paper strip being covered by the white or opaque foil.

The protein test papers can also be sealed to foils in the manner described in copending U.S. application Ser. No. 493,686, or, alternatively, they can be sealed on to foils in the manner described.

Thus, an impregnated strip of porous material adapted for chemical testing can be joined to at least one strip of the material which is substantially inert to both the reagent employed in the impregnation and to the medium in which the testing is to be carried out. This can be accomplished by affixing the test paper strip onto a narrow edge zone of a single synthetic resin foil. It is also possible, of course, to place a test paper strip between two synthetic resin foils and thereafter to weld the two foils together. The test strips were employed in the chemical or clinical laboratory of a hospital for analysis of urine of patients admitted to the hospital. The conventional color charts were employed as standards for interpreting the results. These color standards also can be welded onto a further strip of synthetic resin foil instead of another test paper, such combining test paper and color standard to a single article. The results were entirely satisfactory, reproducible, and consistent with more detailed analyses.

We claim:
1. Diagnostic test paper for the determination of protein in biological fluids, comprising an absorbent carrier which has been impregnated with
   (1) a dyestuff indicator exhibiting the so-called "protein error,"
   (2) an acidic buffer substance, and
   (3) at least one inorganic sulfate.

2. Diagnostic test papers according to claim 1, wherein the inorganic sulfate is a member selected from the group consisting of magnesium sulfate and zinc sulfate.

3. Diagnostic test papers according to claim 1, wherein the dyestuff is a member selected from the group consisting of tetrabromobenzaurin, the ethyl ester of tetrabromophenolphthalein and the butyl ester of tetrabromophenolphthalein.

4. Diagnostic test papers according to claim 1, wherein the buffer is one which can be adjusted to a pH value below 7.

5. Diagnostic test paper according to claim 4, wherein the buffer is a citrate buffer.

6. Diagnostic test paper according to claim 5, wherein said buffer is a combination of citric acid and tertiary sodium citrate.

7. Diagnostic test paper according to claim 1, wherein the impregnated absorbent carrier is maintained between two synthetic resin foils sealed along at least one edge thereof and so as to provide at least one exposed edge of said carrier.

8. Diagnostic test paper according to claim 7, wherein one of said synthetic resin foils is transparent and the other is white in color.

9. Diagnostic test paper according to claim 7, wherein the impregnated absorbent carrier is superimposed over a similar but unimpregnated carrier.

10. Diagnostic test papers according to claim 1, wherein the absorbent carrier has additionally been impregnated with a surface-active agent.

11. Diagnostic test paper according to claim 10, wherein said surface-active agent is a member selected from the group consisting of fatty alcohol sulfonates, alkyl aryl sulfonates, and poly-carboxylic acid ester sulfonates.

12. Diagnostic test papers according to claim 10, wherein the surface-active agent is a nitrogen-containing, anion-active wetting agent.

13. Diagnostic test paper according to claim 12, wherein said surface-active agent is a member selected from the group consisting of fatty acid taurides, fatty acid glycides, polycarboxylic acid alkylamide sulfonic acids, alkyl sulfone glycides and N-substituted fatty amide sulfonates.

14. Process for the preparation of diagnostic test papers for the determination of protein in urine, which comprises impregnating an absorbent carrier with a solution containing an acidic buffer substance and a dyestuff indicator exhibiting the so-called "protein error," thereafter drying the thus impregnated carrier and impregnating the dried absorbent carrier with a solution containing at least one inorganic sulfate and thereafter drying the twice-impregnated absorbent carrier.

15. Process according to claim 14, wherein said inorganic sulfate is used in the form of a 1–10% solution in an organic solvent.

16. Process according to claim 15, wherein said organic solvent is a strongly polar, readily volatile solvent.

17. Process according to claim 16, wherein said solvent is a member selected from the group consisting of methanol and ethanol.

18. Process for the preparation of diagnostic test papers for the determination of protein in urine, which comprises impregnating an absorbent carrier with a solution of an acidic buffer substance, drying the thusly impregnated absorbent carrier, thereafter impregnating the dried strip with a solution containing a dyestuff indicator exhibiting the so-called "protein error" and an inorganic sulfate and drying the twice-impregnated absorbent carrier.

19. Process according to claim 18, wherein the impregnation solution containing the acidic buffer substance additionally contains a surface-acting agent.

20. Process for the preparation of diagnostic test paper for the determination of protein in urine, which comprises impregnating an absorbent carrier in two steps with a solution containing an acidic buffer substance and a dyestuff indicator exhibiting the so-called "protein error" and an inorganic sulfate, drying the twice-impregnated absorbent carrier, and thereafter sealing the dried impregnated absorbent carrier between two synthetic resin foils so as to provide at least one exposed edge of said absorbent carrier.

21. Process according to claim 20, wherein one of said foils is transparent and the other is white in color.

22. Process for the preparation of diagnostic test paper for the determination of protein in urine, which comprises impregnating an absorbent carrier with a solution containing tertiary sodium citrate and citric acid as buffer and tetrabromophenol-blue as a dyestuff indicator capable of exhibiting the so-called "protein error," and thereafter drying the thus impregnated absorbent carrier, impregnating the dry carrier with a solution of magnesium sulfate and thereafter drying the twice-impregnated absorbent carrier.

23. Process for the preparation of diagnostic test paper for the determination of protein in urine, which comprises impregnating an absorbent carrier with a buffer solution containing tertiary sodium citrate, citric acid, and sodium lauryl sulfate, drying the thusly impregnated absorbent carrier, thereafter impregnating the dried strip with a solution containing tetrabromophenolphthalein ethyl ester and magnesium sulfate, and drying the twice-impregnated absorbent carrier.

24. Process for the preparation of diagnostic test paper for the determination of protein in urine, which comprises impregnating an absorbent carrier with a buffer solution containing tertiary sodium citrate, citric acid, and sodium salt of a fatty acid methyl glycide, drying the thusly impregnated absorbent carrier, thereafter impregnating the dried strip with a solution containing tetrabromophenolphthalein ethyl ester and magnesium sulfate, and drying the twice-impregnated absorbent carrier.

References Cited

UNITED STATES PATENTS 2,986,453   5/1961   Collins.

MORRIS O. WOLK, *Primary Examiner.*

E. A. KATZ, *Assistant Examiner.*

U.S. Cl. X.R.

252—408; 167—84.5